July 16, 1968 R. STROMBERG 3,392,946
SELF-STANDING DEVICE
Filed Oct. 6, 1966 6 Sheets-Sheet 1
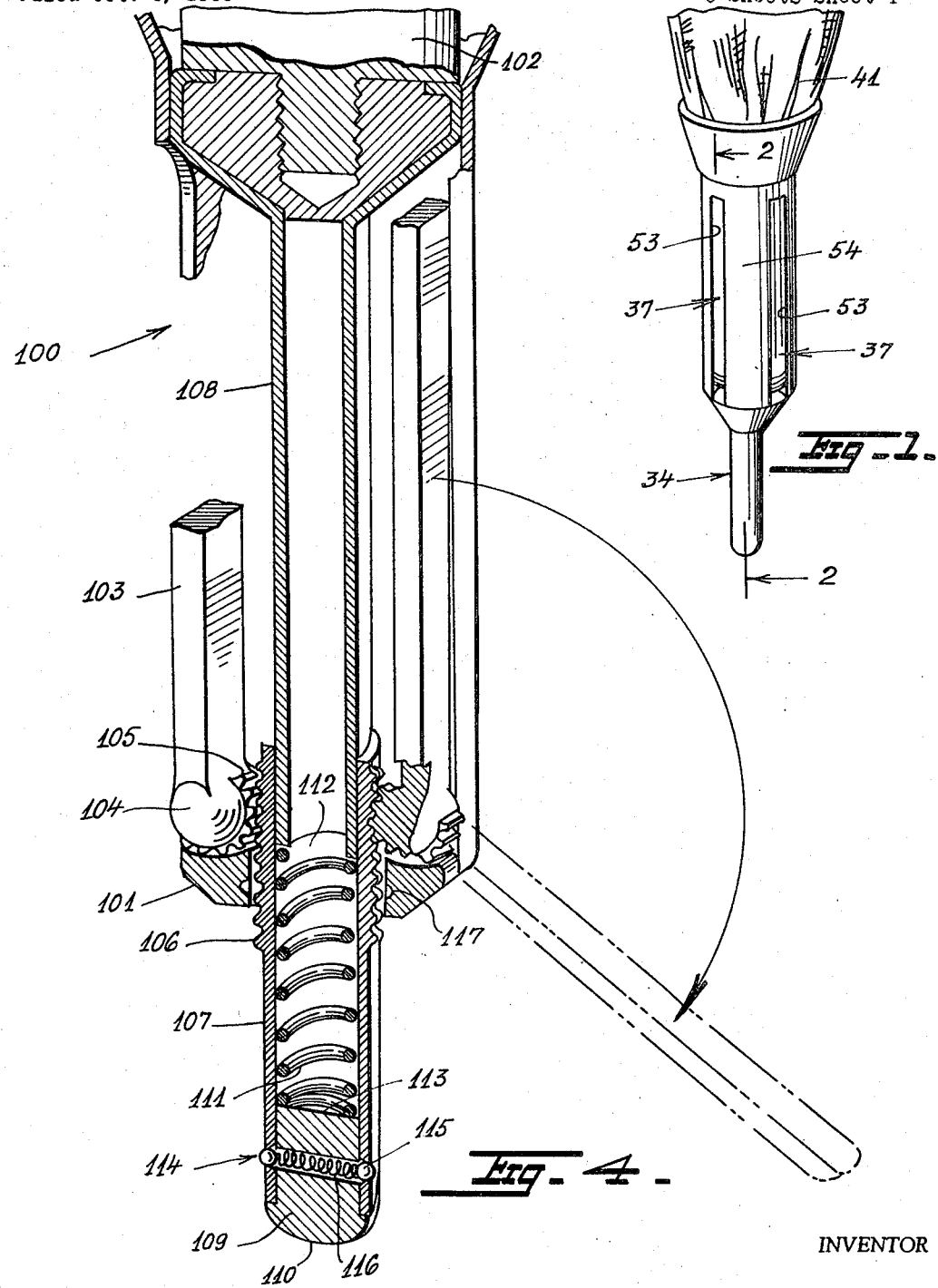
INVENTOR
Richard Stromberg
BY Polachek & Saulsbury
ATTORNEYS

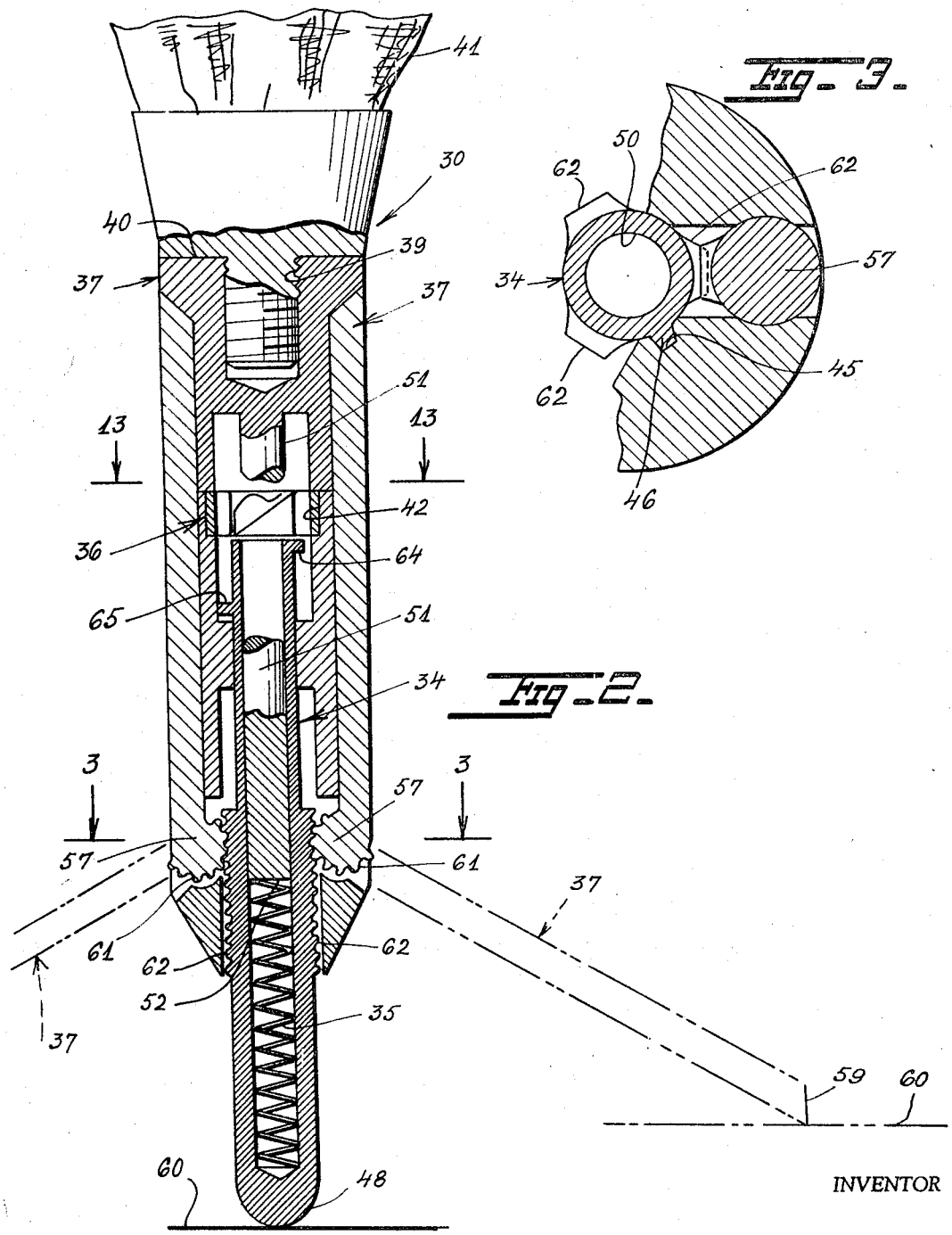

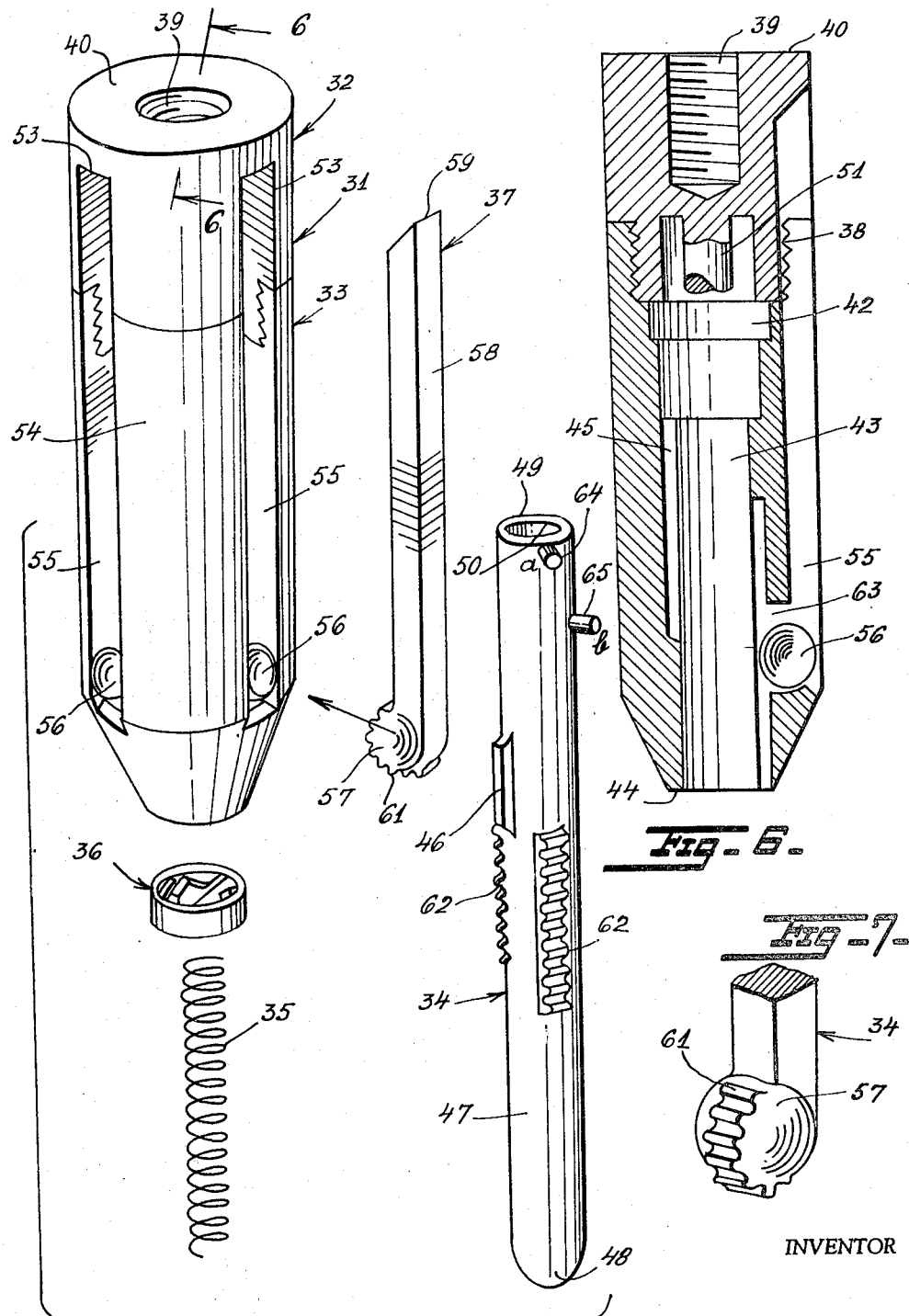

July 16, 1968  R. STROMBERG  3,392,946
SELF-STANDING DEVICE
Filed Oct. 6, 1966  6 Sheets-Sheet 4
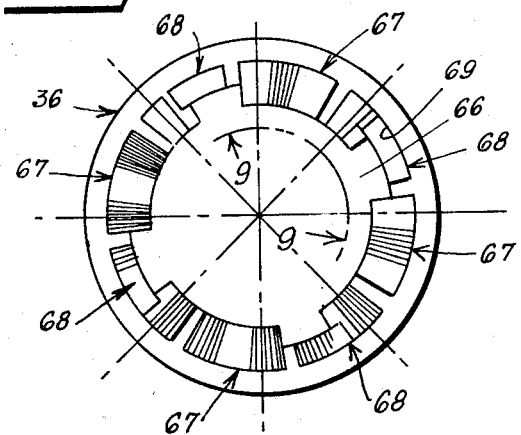
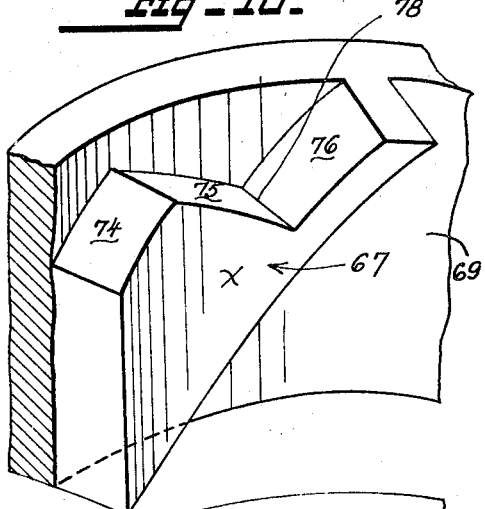
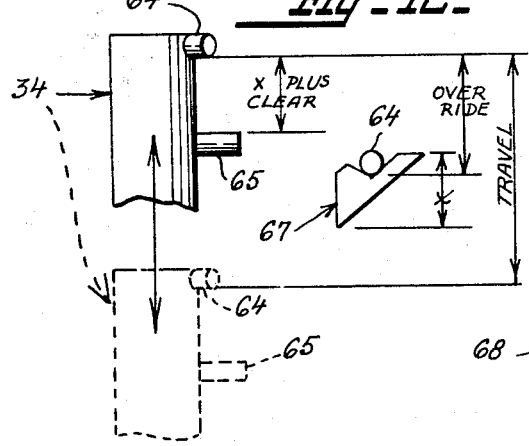
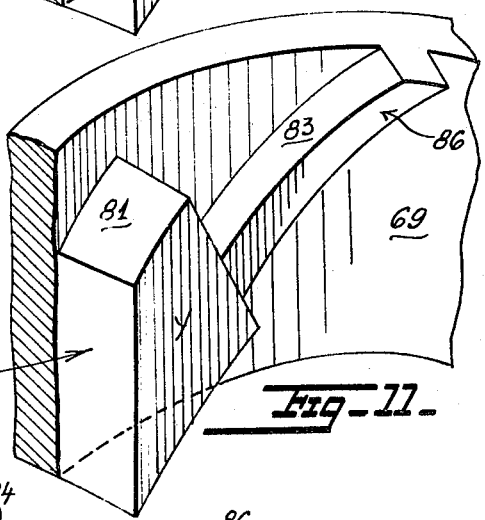
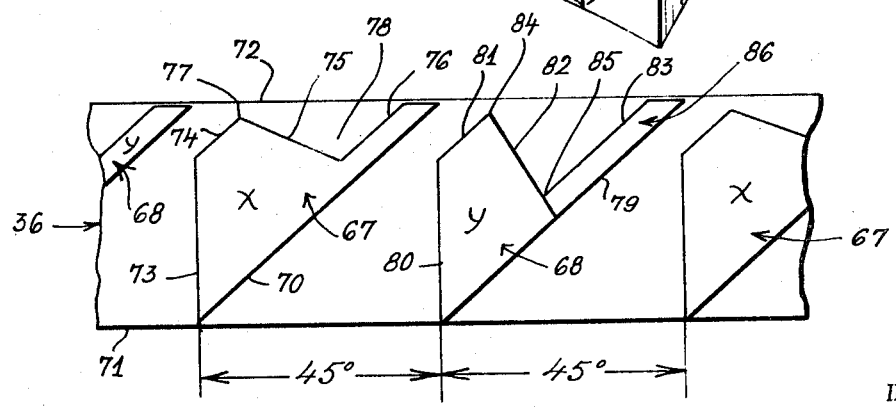
INVENTOR
Richard Stromberg
BY Polachek & Saulsbury
ATTORNEYS INVENTOR
Richard Stromberg
BY Polachek & Saulsbury
ATTORNEYS

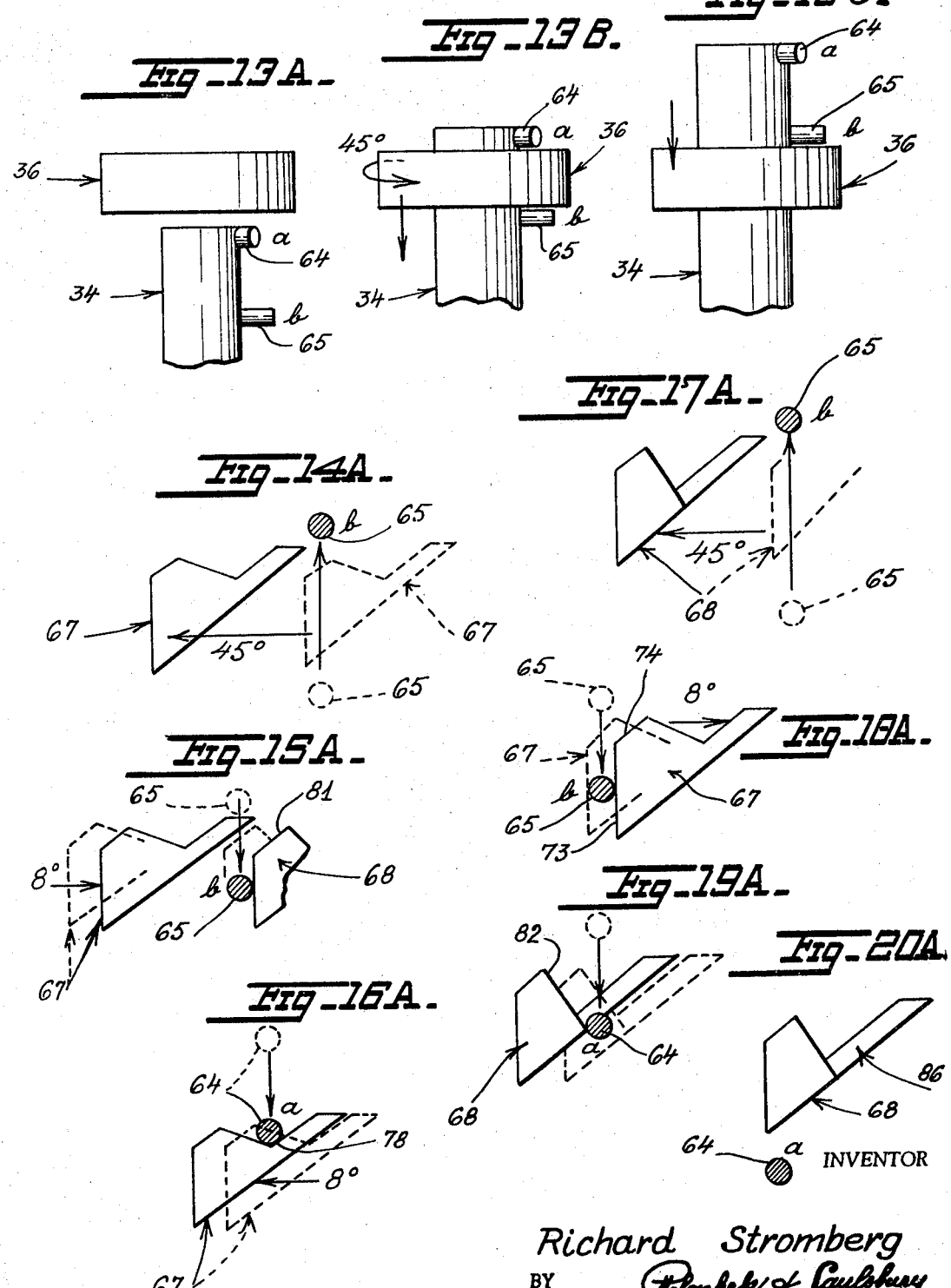

United States Patent Office 3,392,946
Patented July 16, 1968

1

3,392,946
SELF-STANDING DEVICE
Richard Stromberg, 555 Kappock, St., Apt. 5U,
Riverdale, N.Y. 10471
Filed Oct. 6, 1966, Ser. No. 584,742
7 Claims. (Cl. 248—171)

ABSTRACT OF THE DISCLOSURE

A self-standing device or stanchion adapted to be attached to the lower end of a vertically elongated device such as an umbrella and the like for supporting the umbrella and the like in an upright position. The device or stanchion is readily securable to the lower end of the umbrella and the like and has self contained means for being adjustable between an extended and retracted position so as to support the umbrella in a vertical position when desired. The self-standing device is readily adjustable between an extended and retracted position and either position may be attained by a simple movement of the device against the surface of a floor. The device includes a housing with movable legs having a gear and rack connection with the housing.

SUMMARY OF THE INVENTION

A self standing device having a housing with means for securing the device to the bottom end of an elongated object such as an umbrella. The housing has a plurality of elongated slots adapted to receive a plurality of equally spaced apart legs. Means is provided including a gear and rack connection for pivotally moving the legs outwardly from the slots and from the retracted position to an extended position.

This invention relates generally to vertically self-supporting stanchions and the like. More specifically it relates at attachments securable to the lower ends of various vertically elongated devices in order to make them vertically self-standing.

A principal object of the present invention is to provide a self-standing device which is readily securable to a lower end of those objects such as umbrellas, canes, crutches, poles, long-legged stools or the like and which have self-contained means for being adjustable between an extended and retracted position so as to support the same in a vertical position when desired.

Another object of the present invention is to provide a self-standing device which is readily adjustable between an extended and retracted position and wherein either position may be attained by a simple movement of the device against the surface of a floor.

Yet another object of the present invention is to provide a self-standing device wherein a like movement is used to either extend or retract the device as desired.

Yet another object of the present invention is to provide a self-standing device which incorporates a minimum number of parts for accomplishing the adjustment between an extended and retracted position of the device.

Other objects of the present invention are to provide a self-standing device which is simple in design, inexpensive to manufacture, rugged in construction, easy to use and efficient in operation.

These and other objects will be readily evident upon a study of the following specification and the accompanying drawings wherein:

FIGURE 1 is a perspective view of the present invention shown secured to the lower end of an umbrella or the like.

FIG. 2 is a cross sectional view taken on the line 2—2 of FIG. 1.

FIG. 3 is an enlarged fragmentary cross sectional view taken on the line 3—3 of FIG. 2.

FIG. 4 is a cross sectional view similar to FIG. 2 and showing a modified form of construction.

FIG. 5 is an exploded perspective view of the various elements comprising the present invention.

FIG. 6 is a cross sectional view taken on the line 6—6 of FIG. 5.

FIG. 7 is an enlarged fragmentary perspective view of the lower portion of the retractable leg illustrated in FIG. 5.

FIG. 8 is an enlarged plan view of a rotatable cam member illustrated in FIG. 5.

FIG. 9 is a view taken in the direction 9—9 on FIG. 8, and showing the cam details.

FIG. 10 is an enlarged perspective view of one of the cam elements shown in FIG. 9.

FIG. 11 is an enlarged perspective view of another of the cam elements illustrated in FIG. 9.

FIG. 12 is a diagrammatic side elevation view of certain portions of relative parts illustrated in FIG. 5.

FIG. 13a is a side elevation view of the rotatable cam member and the upper portion of a vertically movable actuating post shown in relative position to the rotatable cam member at the start of the cycle of operation.

FIG. 13b is a similar view of the cam member and upper portion of the actuating post shown in a subsequent step of operation.

FIG. 13c is a similar view thereof shown in a next subsequent step of operation.

FIG. 14a is a diagrammatical view of one of the cam elements relative to a pin on the actuating post when in the position shown in FIGS. 13c and 14.

FIG. 15a is a view similar to FIG. 14a showing a next subsequent step of operation when the cam member and actuating post are in the position shown in FIG. 15.

FIG. 16a is a view similar to FIG. 15a showing a next subsequent position and when the parts are as shown in FIG. 16.

FIG. 17a is a view similar to FIG. 16a and showing the other of the cam elements in relation to a pin on the actuating post when the cam member and actuating post are in the position shown in FIG. 17.

FIG. 18a is a view similar to FIG. 16a showing the relative position of parts illustrated in FIG. 18.

FIG. 19a is view similar to FIG. 17a showing the relative position of parts illustrated in FIG. 19.

FIG. 20a is a view similar to FIG. 19a showing the relative position of parts when in the position shown in FIG. 20.

Figure 13:
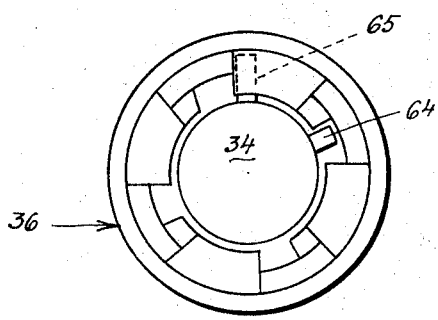
FIG. 13 is a top plan view of the rotatable cam member shown in a position at the start of a cycle of operation.

Referring now to the drawings in detail, the reference numeral 30 represents a self-standing device according to the present invention, and as illustrated in all the figures of the drawings except FIG. 4, and wherein there is a housing 31, comprised of an upper and lower member 32 and 33 respectively, an actuating post 34, a compression coil spring 35, a rotatable cam member 36 and a plurality of extendable and retractable legs 37.

The housing 31 is a generally elongated cylindrical unit comprised of members 32 and 33 threadingly secured together as shown at 38, the upper member 32 having a threaded opening 39 in the upper end 40 thereof for purpose of securing the device 30 to the lower end of an umbrella or other vertical member.

The rotatable cam member 36 is retained rotatably free within a seat 42 located concentrcially on the longitudinal axis of the housing 31 and being positioned between the upper and lower members 32 and 33. A cylindrical opening 43 communicates with the lower end 44 of the housing and is provided to receive therein the vertically slidable actuating post 34. A key way 45 formed on one side of the opening 43 is adaptable to receive a key 46 formed on the post 34 for the purpose of preventing the post from rotating within the opening 43.

Actuating post 34 comprises a generally cylindrical member having a generally cylindrical outer side wall 47, the lower end 48 of the post being generally rounded and the upper end comprising a peripheral edge 49 for a cylindrical opening 50 concentrically within the post, as shown in FIG. 5 of the drawing.

The compression coil spring 35 is placed within the lower end of the opening 50.

A depending post 51 is integrally formed on the upper member 32 of the housing 31, the post 51 being cylindrical in configuration, concentric with the axis of the housing 31 and receivable within the upper end of the opening 50 of the actuating post, the lower end 52 of the depending post 51 bearing against the upper end of the compression coil spring 35.

The housing 31 is provided with a plurality of equally spaced apart vertical slots 53 formed within the side wall 54 of the housing, each of the slots 53 comprising a recess for receiving therein one of the retractable legs 37. Each of the slots 53 has a pair of side walls 55 having a concave depression 56 at its lower end for purpose of receiving therein a sphere 57 formed on the lower end of each retractable leg 37. The concave depressions form bearings within which the sphere 57 is rollable so to permit the retractable leg to be pivoted from within the slot 53 to an extended position as shown in phantom lines in FIG. 2 of the drawing. Each retractable leg 37 is made preferably from a material such as plastic or the like so that it might be slightly flexed. The retractable leg is generally square in cross section and has a front wall 58 which is flush with the side wall 54 of the housing 31 when the leg is in a retracted position. The end 59 of the retractable leg may be angled as shown in FIG. 5 so to fit within the slot 53 in a flush manner or it may be rounded as shown in FIG. 4 for engagement upon a floor 60. An arcuately configurated toothed rack 61 is integrally formed upon the rear side of this sphere 57, each rack 61 being engageable with a straight rack 62 formed upon the side wall 47 of the actuating post 34. A recess 63 is formed between the opening 43 and each slot 53 so that the teeth of the racks 61 and 62 may be engaged. For purpose of greater clarity the arcuate rack 61 may be referred to as a gear.

Actuating post 34 is additionally provided with a pair of radially outwardly extending pins 64 and 65, as shown in FIG. 5, the pins being engageable with cam surfaces located upon the inner side of the rotatable cam member 36.

The rotatable cam member 36 comprises a generally circular collar-shaped member having a central opening 66 through which the actuating post 34 is vertically slidable. As shown in FIGS. 8 and 9, the rotatable cam member is shown to include a plurality of first cam elements 67 and a plurality of second cam elements 68. The cam elements 67 and 68 are alternately located around the inner side wall 69 of the cam member and project radially inwardly therefrom. In the present design, one first cam element and one second cam element are located within each 90 degrees of the cam member. The first cam element 67 includes a lower inclined side 70 which extends from the lower edge 71 of the cam member 36 to the upper edge 72 thereof. The cam element 67 further includes a vertical edge 73 upon one side thereof and a plurality of diagonal edges 74, 75 and 76 upon its upper side. The edges 74 and 75 form an outward extending point 77 therebetween, and the edges 75 and 76 form a pocket 78 therebetween. The second cam element 68 includes a diagonally extending lower edge 79 extending from the lower edge 71 of the cam member to the upper edge 72 thereof, the second cam element further including a vertical side edge 80 and a plurality of diagonal edges 81, 82 and 83 upon its upper side. The edges 81 and 82 form an upward extending point 84 therebetween and the edges 82 and 83 form a pocket 85 therebetween. It is to be noted that the first cam element 67 is of equal thickness throughout whereas the second cam element 68 has a portion 86 which is defined between the edges 83 and the upper portion of edge 79 which is relatively thinner in thickness. A close inspection of FIGS. 13 and 13a will readily indicate that the upper pin 64 upon the actuating post is relatively shorter in length than the lower pin 65. Accordingly during operation, it will be readily evident that the pin 65 will engage the working synthesis or edges of both the first and second cam elements whereas the relatively shorter pin 64 will not engage with the portion 86 of the second cam element.

In the present construction the device is designed so that the retractable legs 37 can be readily moved between a retracted and extended position with a minimum amount of effort expended by the operator. If, for example, the device 30 is mounted upon the lower end of an umbrella, the same may be used to allow the umbrella to stand upright without leaning against any support, such a position being used when the umbrella is wet and it is desired that the water drops will drain vertically therefrom instead of against any leaning surface. In a retracted position, the device will appear as shown in FIG. 1 of the drawing and wherein there are no protruding legs and the umbrella may be used in a conventional manner. When, however, it is desired that the umbrella be made to stand alone in a vertical position, then the operator needs only to push downwardly upon the umbrella handle for a relatively short distance while the lower end of the device is resting against the surface of the floor. This downward pressure exerted upon the umbrella handle will cause the legs 37 to be pivoted outwardly into the extended position shown in FIG. 2. When the legs are thus extended, they will become locked in the new position and the operator may remove his grasp of the umbrella handle. The umbrella will now stand freely upright. When it is desired that the legs be again retracted so that the umbrella may be used in a conventional manner, then the operator again repeats the same movement of depressing the umbrella handle downwardly while the umbrella device 30 bears against the floor surface and the legs will then pivot again upwardly into the housing 31. Each alternate depressing movement of the handle will cause the legs to extend and each alternate depressing movement of the handle will cause the legs to retract. Thus by a simple motion the operator may change the leg position from an existing condition to an alternate position.

While the above description of the operation indicates only the resultant movement of the legs 37, the following description is a detailed account of the mechanical movements for accomplishing the same.

Figure 14:
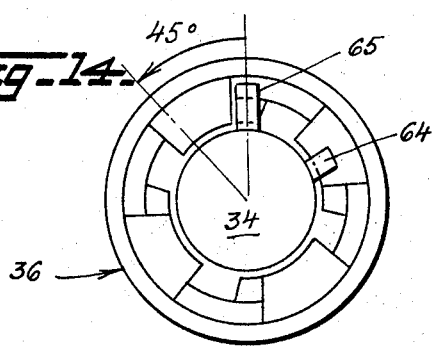
FIG. 14 is a top plan view of the rotating cam member shown in a position relative to the actuating post when in the position illustrated in FIG. 13c.
Figure 18:
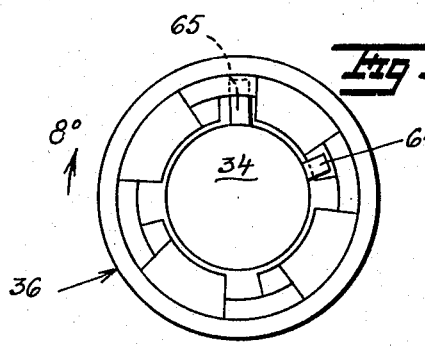
FIG. 18 is a plan view similar to FIG. 17 shown in a next subsequent position.
Figure 15:
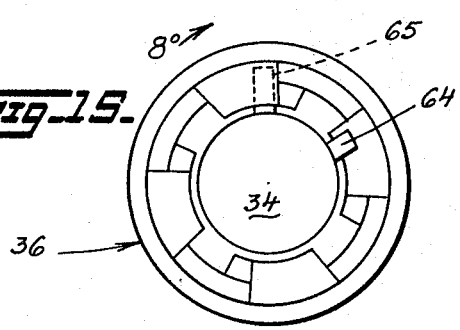
FIG. 15 is a top plan view of the cam element and actuating post in a next subsequent step.
Figure 19:
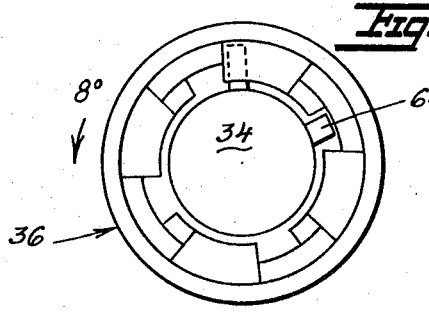
FIG. 19 is a plan view similar to FIG. 18 showing the parts in a next subsequent position.
Figure 16:
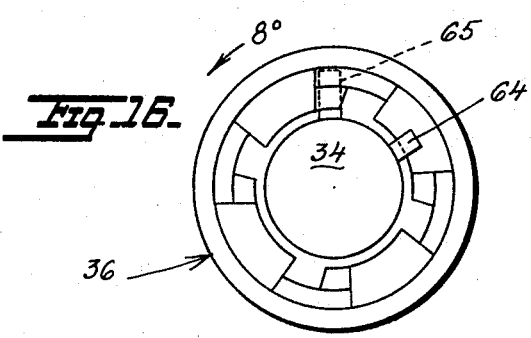
FIG. 16 is a view similar to FIG. 15 showing a next subsequent position.
Figure 20:
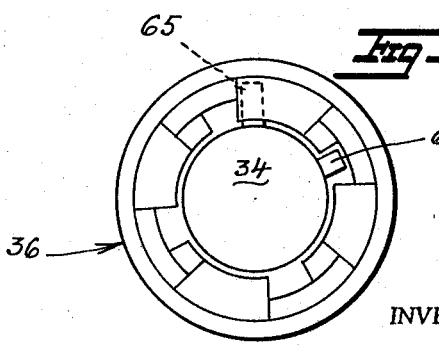
FIG. 20 is a plan view of the parts shown in FIG. 19 shown in a next subsequent position.

At the start of the cycle of operation the legs 37 may be assumed to be in a retracted position as is shown in FIG. 2 of the drawing. Downward pressure upon the umbrella handle is transmitted from umbrella 41 to the housing 32 which accordingly moves downwardly around the post 34. The downward movement of the housing 31 causes the cam member 36 to be moved downwardly around the upper portion of the actuating post 34 and causing the pins 64 and 65 to engage the cam elements within the cam member 36. The relative movement of the cam member respective to the post 34 is shown in FIGS. 13a, 13b and 13c, wherein the cam member is shown at the start of the cycle located higher than the upper end of the post and is moved downwardly to a position wherein it is entirely below the lower pin 65. During this movement the cam member is made to rotate 45 degrees as is indicated in FIG. 13b. During this downward movement the racks 62 on the post cause the gears 61 on each leg 37 to turn, thereby swinging the legs outwardly into the extended position. When the legs 37 are thus extended, means is provided by the cam member so that the legs remain in this position after the device has thus been depressed. During the movement shown in FIGS. 13a, 13b and 13c, the pins 64 and 65 moved vertically upward respective to the cam member. As shown in FIG. 13 the pin 64, which is located approximately 60 degrees away from pin 65 has not engaged any portion of the cam member whereas the pin 65 has engaged the edge 70 of the cam element 67 causing the cam member to rotate 45 degrees while the pin moved vertically from the position indicated by phantom line to the position indicated by solid lines in FIG. 14a. Upon release of the umbrella handle, the spring 35 bearing against the lower end 52 of the depending post 51 will cause the housing to lift thereby causing the pin 65 to engage the edge 81 of the cam element 68 causing the cam member to reverse direction for approximately 5 degrees after which the pin 65 moves vertically downward relative to the edge 80 of the cam element 68 as shown in FIG. 15a. After pin 65 has passed through the cam member the pin 64 engages the edge 75 of cam 67 causing the same to again move forwardly until the pin 64 becomes caught in the pocket 78 during which time the cam member has rotated again forwardly an equal distance to the distance that cam 65 has moved the cam member rearwardly upon striking the edge 81. This distance rearwardly and then again forwardly may be possibly 5 degrees or 8 degrees according to the design of the device. In FIG. 16a the pin 64 is shown engaged in the pocket 78 thereby arresting further respective travel of the post 34 relative to the cam member 36. Thus the legs are locked in an extended position.

Figure 17:
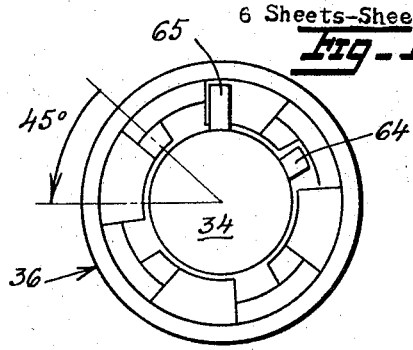
FIG. 17 is a plan view similar to FIG. 16 showing a next subsequent position.

When it is desired that the legs be again retracted the umbrella handle is again downwardly depressed causing the pin 65 to travel upwardly and engage the edge 79 of the cam element 68 thereby causing the cam member to travel forwardly 45 degrees as indicated in FIGURE 17a. During this time, of course, the pin 64 has likewise been moving upwardly and upon release of the umbrella handle against further pressure toward the floor, the pin 65 will strike the edge 74 of cam element 67 causing the cam member to rotate in a reverse direction approximately 5 or 8 degrees, after which the pin 65 will descend through the cam member adjacent the vertical edge 73 of the cam 67. After the pin 65 has passed through the cam member 36, the pin 64 engages the edge 82 of cam 68 thereby causing the cam member to rotate in a forwardly direction an equal amount of five or eight degrees which was lost in a previous reverse movement. After the pin 64 has disengaged contact with edge 82 the pin travels unarrested through the cam member thereby permitting the housing 31 to be fully lifted upwardly and cause the racks 62 to rotate their gears 61 in a reverse direction thereby causing the legs 37 to be rotated upwardly again into a retractive position as shown in FIG. 1.

Obviously there must be a certain amount of override as indicated in FIG. 12 due to the uppermost position of pin 64 in the position wherein it is seated in the pocket 78. In actual construction this should be kept at the minimum and the legs 37 should be made to flex slightly so to accommodate this extra motion during the entire time of which the leg ends 59 are engaged upon the floor 60. Thus it has been shown that upon each 90 degree rotation of the cam member a complete cycle of extending the legs and retracting the legs has been accomplished.

In a modified construction shown in FIG. 4 the device 100 is shown to include a housing 101 which is threadingly secured to the lower end 102 of an umbrella or other longitudinal member. The device includes a plurality of pivotable legs 103 likewise supported within slots formed in the housing, each leg having a sphere 104 which is journalled in bearings in the housing as above described. Each leg has a gear 105 which is engageable with a rack 106 upon a slidable sleeve 107. The sleeve 107 is slidable vertically around a tube 108 which forms an integral rigid part of the housing 101. The plug 109 is fitted within the lower end of the sleeve 107 and is rounded upon its bottom 110 as shown in the drawing. A compression coil spring 111 is placed within the sleeve 107, the upper end of the spring bearing against the lower edge 112 of the tube 108 and the lower end of the spring bearing against the upper edge 113 of the plug 109. A spring loaded detent device 114 is fitted into the lower end of the sleeve 107 and plug 109, the detent having a plurality of balls 115 which are normally urged outwardly by a compression coil spring 116 for purpose of engaging the balls within recesses 117 in the housing.

In operative use the present modified form is likewise operated by pushing down upon the umbrella handle while the lower end 110 rests against a floor. Such motion will likewise cause relative movement between the gears 105 and racks 106 thereby pivoting the legs outwardly into the position as shown by the phantom lines in the drawing. However in this modified form of the invention it is necessary that the movement of the operator's hand be relatively slow at the end of the stroke so that the detent 114 becomes engaged with the recesses 117. When it is desired that the legs be again retracted into the original position, the operator may then provide a relatively fast initial push downwardly against the floor thereby causing the detent to dislodge from the recesses 117, after which the relatively strong compression coil spring 111 will cause the housing to be lifted upon the sleeve 107 thereby causing the gears 105 to rotate in a reverse direction and cause the legs to close pivotally upwardly into the original slots provided in the housing.

While various changes may be made in the detail construction, it is understood such changes would be within the sphere and scope of the present invention as is provided by the appended claims.

I claim:

1. In a self-standing device the combination of a housing, means for securing said housing to the lower end of an elongated object that is desired to be supported vertically, a plurality of equally spaced apart legs, said legs being pivotally supported upon such housing, a plurality of vertical elongated entirely slots within said housing, each one of said slots receiving one of said legs when in a retracted position and means for pivotally moving said legs outwardly from said slots and from said retracted position to an extended position, said latter means comprising an elongated central opening in the lower portion of said housing, a slidably actuating post vertically slidable within said opening the lower end of said actuating post extending outwardly downward out of said housing, said actuating post having a plurality of two racks integrally formed thereupon, each of said pivotable legs having an integral gear at its one end, each of said gears being in engagement with one of said toothed racks, said ends of each of said legs having said gears being journalled in said housing whereby vertical movement of said actuating post causes said racks to rotate said gears and pivot said legs between said retracted and extended positions, said housing having a depending central post, said post being receivable within an opening in the upper end of said actuating post, the lower end of such depending post being in abutment with the upper end of a compression coil spring, the lower end of said compression coil spring being in abutment with the lower portion of said actuating post for providing a return action to normally urge said pivotable legs from an extended position to said retracted position, said legs when extended defining an equally spaced three-point support.

2. A combination as set forth in claim 1 wherein lock means are provided for retaining said legs in extended position, said lock means including a rotatable cam member, said rotatable cam member being supported within a concentric seat within said housing and said actuating post being movable vertically through said rotatable cam member.

3. A combination as set forth in claim 2 wherein said rotatable cam member comprises a circular collar configurated member, said member having a cylindrical outer side bounded by an upper and lower edge, said member having a circular inner side defining a central opening for receiving said actuating post therethrough, and said cylindrical inner side having a plurality of cam elements engageable with said actuating post to provide said locking means.

4. A combination as set forth in claim 3 wherein said cam elements of said rotatable cam member comprises a plurality of first cam elements and a plurality of second cam elements, said first and second cam elements being alternately disposed circularly around said inner wall of said rotatable cam member, the first of said cam elements providing a means for locking the vertical travel of said actuating post, and the second of said cam elements providing free vertical travel of said actuating post relative to said rotatable cam member.

5. A combination as set forth in claim 4 wherein the first of said cam elements comprises a cam having a diagonally inclined lower edge, a vertical leading edge, and a pocket upon its upper side, said pocket having downwardly converging adjacent edges.

6. A combination as set forth in claim 5 wherein the second of said cam elements comprises a cam having a diagonally extending lower edge, a vertical leading edge, and a diagonal upper edge.

7. A combination as set forth in claim 6 wherein said actuating post has a pair of radially extending pins in the upper portion thereof, said pins being approximately sixty degrees radially apart, said pins being located vertically apart along said actuating post, the upper of said post pins being relatively short in length, the lower of said post pins being relatively longer, said longer pin being engageable by both said first cam elements and second cam elements, said second cam element having an upper portion thereof relatively narrower in radial thickness whereby said upper shorter pin engages said first cam element and only a portion of the said second cam element to provide release means of said actuating post from a locked position.

References Cited

UNITED STATES PATENTS

| | | | |
|---|---|---|---|
| 575,529 | 1/1897 | Stephens | 248—171 XR |
| 1,089,295 | 3/1914 | Vallier | 248—155 XR |
| 2,753,879 | 7/1956 | Rosen | 248—171 XR |
| 2,777,692 | 1/1957 | Marzucco | 248—408 XR |

FOREIGN PATENTS

| | | |
|---|---|---|
| 361,633 | 10/1922 | Germany. |

ROY D. FRAZIER, *Primary Examiner.*

R. P. SEITTER, *Assistant Examiner.*